United States Patent [19]

Fujii et al.

[11] Patent Number: 4,802,077
[45] Date of Patent: Jan. 31, 1989

[54] PWM INVERTER CONTROLLER

[75] Inventors: Hiroshi Fujii; Yuichiro Nagato, both of Chiba, Japan

[73] Assignee: Hitachi, Ltd., Tokyo, Japan

[21] Appl. No.: 162,082

[22] Filed: Feb. 29, 1988

[30] Foreign Application Priority Data

Mar. 20, 1987 [JP] Japan ................................ 62-63917

[51] Int. Cl.$^4$ ............................................. H02M 1/12
[52] U.S. Cl. ...................................... 363/41; 363/37; 363/97; 318/811
[58] Field of Search ................. 363/35, 37, 41, 96–98, 363/131, 132; 318/799, 800, 801, 802, 808, 810, 811

[56] References Cited

U.S. PATENT DOCUMENTS

| 4,318,167 | 3/1982 | Ängquist | 363/41 |
| 4,615,000 | 9/1986 | Fujii et al. | 363/98 |
| 4,740,738 | 4/1988 | El-Antably et al. | 318/723 |

Primary Examiner—Peter S. Wong
Attorney, Agent, or Firm—Antonelli, Terry & Wands

[57] ABSTRACT

A PWM inverter provided with a sinusoidal waveform generator circuit which produces modulated waves to switch the asynchronous operation into the synchronous operation when the output of a frequency commander commands a frequency greater than a predetermined value and when the sinusoidal waveform generator produces an output of a phase that is zero.

7 Claims, 4 Drawing Sheets

PWM INVERTER CONTROLLER

BACKGROUND OF THE INVENTION

1. Field of the Invention

The present invention relates to an apparatus for controlling a pulse width-modulated (hereinafter referred to as PWM) inverter which converts a DC power into an AC power. More specifically, the invention relates to a PWM inverter which, in an asynchronous operation mode of a low output frequency, performs asynchronous operation with a constant cut period irrespective of the change in the output frequency and which, in a synchronous operation of a high output frequency, performs synchronous operation whose cut period changes accompanying the change in the output frequency.

2. Description of the Prior Art

When a PWM inverter is to be shifted from the asynchronous operation to the synchronous operation or from the synchronous operation to the asynchronous operation, it is essential to minimize the phase difference between the modulated wave and the carrier wave to suppress the transient phenomenon.

In order to shift the inverter from the asynchronous operation to the synchronous operation under the condition of a small phase difference, a method has been proposed in Japanese Patent Laid-Open No. 174070/1985 according to which the synchronous carrier waves and the asynchronous carrier waves are produced simultaneously while gradually changing the period of the asynchronous carrier waves, and the inverter is shifted from the asynchronous operation to the synchronous operation when the frequency and phase of these waves are brought into agreement.

According to the prior art, however, both the synchronous carrier waves and the asynchronous carrier waves must be produced at the same time, requiring a complex circuit structure.

SUMMARY OF THE INVENTION

The present invention was accomplished to improve the above-mentioned defects, and its object is to provide a PWM inverter which is capable of being smoothly shifted from the asynchronous operation to the synchronous operation without simultaneously producing the asynchronous carrier waves and the synchronous carrier waves.

The above object is accomplished by the provision of a frequency commander, a first digital signal generator, a timing signal generator, and adder, a phase detector, a selector, a second digital signal generator, a sinusoidal data selector, a digital calculator, a PWM signal generator, and a drive circuit.

Among them, the frequency commander commands a frequency that is to be produced by the inverter.

The first digital signal generator receives an output of the frequency commander, and produces a digital signal of a level that corresponds to the output in an asynchronous operation mode where the output is small, and produces a digital signal of a predetermined level in a range of low output frequencies in a synchronous operation mode where the output is great.

The timing signal generator generates pulses of a predetermined period in the asynchronous operation mode, and generates pulse signals of a period that corresponds to the output of the frequency commander in at least a range of low output frequencies in the synchronous operation mode.

The adder produces a phase signal by adding up signals produced by the first digital signal generator every time when the timing signal generator produces a signal, and produces a value obtained by subtracting $2\pi$ from the added value when the phase signal has exceeded $2\pi$.

The phase detector detects an output of the adder that lies within a predetermined range.

The selector switches the asynchronous operation to the synchronous operation when the output of the frequency commander becomes greater than a predetermined value and the output of the phase detector lies within a predetermined range of output of the adder.

The second digital signal generator works in response to the output of the frequency commander and produces a digital signal whose level increases with the increase in the level of the above output.

The sinusoidal waveform generator receives the output of the adder, and produces data of a sinusoidal waveform that corresponds to the phase signal produced by the adder.

The digital calculator receives output of the second digital signal generator and output of the sinusoidal wave generator in synchronism with a timing signal produced by the timing signal generator, and calculates a timing for generating a PWM signal.

The PWM signal generator generates a PWM signal based upon the output of the digital calculator.

The drive circuit produces a drive signal that will be fed to a power element of the inverter in response to the output of the PWM signal generator. The drive circuit has been disclosed in detail in U.S. Pat. No. 4,615,000.

If a voltage command is denoted by V, pulse widths Tp1 and Tp2 for determining the output voltage are given by the following equations (1) and (1'), $$Tp1 = Tc/2 + Tc/2 \cdot V \cdot \sin\theta \tag{1}$$

$$Tp2 = Tc/2 - Tc/2 \cdot V \cdot \sin\theta \tag{1'}$$

where, $$V = Kf(\sin\theta + 1) \tag{2}$$

$$\theta = \theta + \Delta\theta \tag{3}$$

$$\Delta\theta = 2\pi TC \tag{4}$$

K: constant
f: frequency command
$\theta$: phase
TC: one-half of the period of carrier waves.

Equations equivalent to the equations (1) and (1') have been disclosed in U.S. Pat. No. 4,615,000.

From the output frequency command D(f), sinusoidal wave table capacity w (corresponds to phase $2\pi$ of the adder 2), and the predetermined addition time $\Delta t$, the output frequency Fout is expressed by, $$F\text{out} = \frac{1}{\frac{w}{D(f)} \times \Delta t} \tag{5}$$

By setting the addition time $\Delta t$ to be constant, there are obtained pulses having a predetermined phase gap. By stepping up the addition time $\Delta t$, furthermore, there is obtained a pulse width that meets the sinusoidal waves.

The output frequency can be changed by simply changing the output frequency command D(f) if the sinusoidal wave table capacity w and the addition time Δt remain constant. This means that how many times the sampling is effected in one period of the sinusoidal wave table; i.e., the greater the output frequency command D(f), the higher the output frequency and the smaller the output frequency command, the lower the output frequency. If explained in conjunction with FIG. 6, let it be presumed that the data D(f) and D(f') are sampled at the same time. The data have a relationship D(f')=2×D(f). When the sampling is to be effected for a whole period, therefore, the system that effects the sampling at D(f) takes the time which is twice as long as the time of the system that effects the sampling at D(f'). That is, D(f') produces a frequency twice as great as that of D(f). In this case, the equation (3) is written as follows:

$$\theta = \Sigma D(f) + D(f) \qquad (6)$$

Here, the period of output pulses of the timing signal generator is related to the period of the carrier wave, and the output of the timing signal generator is in synchronism with the carrier waves (i.e., imaginary carrier waves since they are not really produced). The output of the adder, on the other hand, represents the phase of the modulated waves (i.e., imaginary modulated waves since they are not really produced).

Therefore, if the output of the adder means which lies within a predetermined range is detected by the phase detector, and if the operation is shifted from the asynchronous operation to the synchronous operation under the AND condition where the output of the phase detector and the output of the frequency commander exceeds predetermined values, then the operation can be shifted from the asynchronous operation to the synchronous operation involving little transient phenomenon without the need of producing the asynchronous carrier waves and synchronous carrier waves simultaneously.

DESCRIPTION OF THE PREFERRED EMBODIMENT

Figure 1:
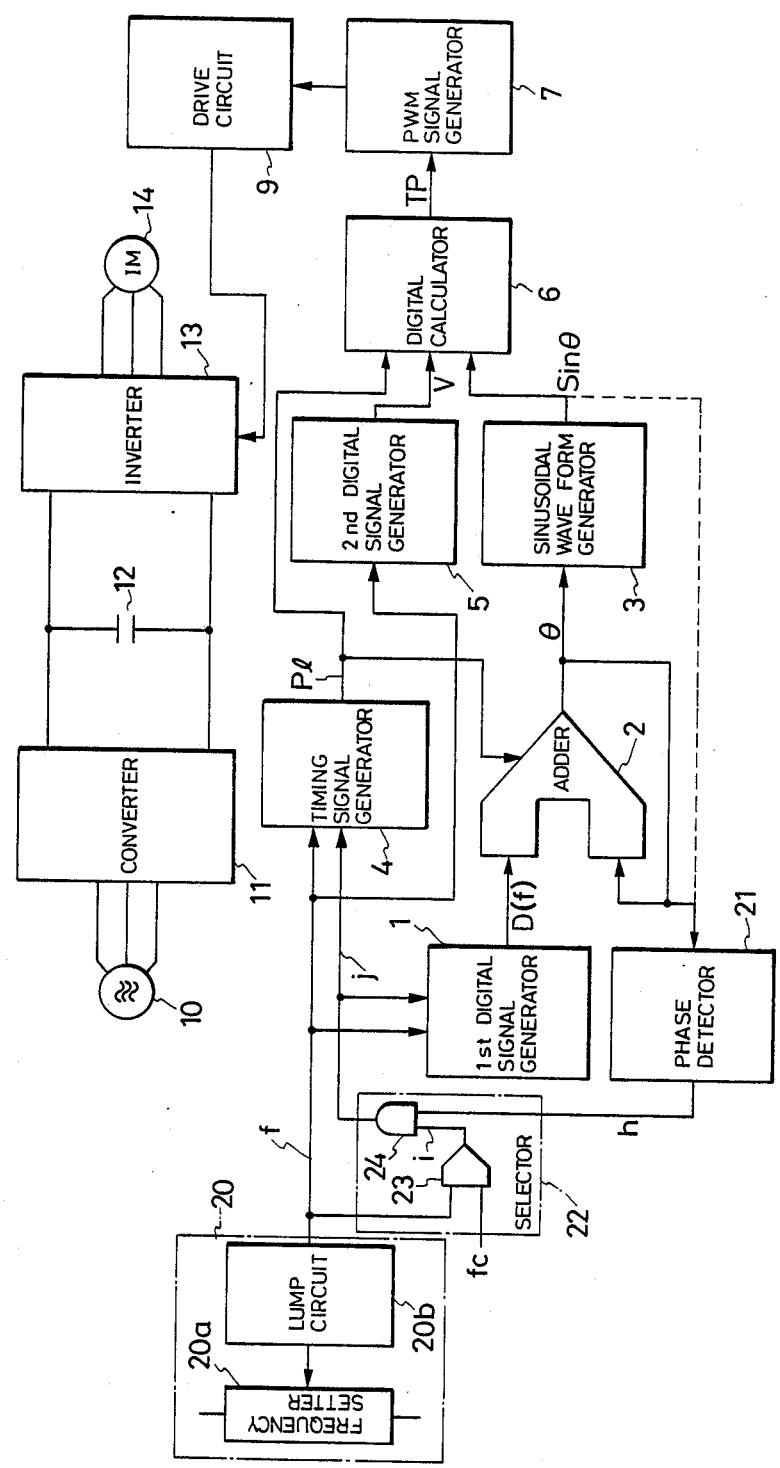
FIG. 1 is a block diagram which illustrates an embodiment of the present invention.

An embodiment of the present invention will now be described in conjunction with FIGS. 1 to 6.

The AC power supplied from a three-phase AC power source 10 is converted by a converter 11 into the DC power, smoothed by a smoothing capacitor 12, converted again by an inverter 13 into the AC power, and is supplied to an electric motor 14.

Figure 5:
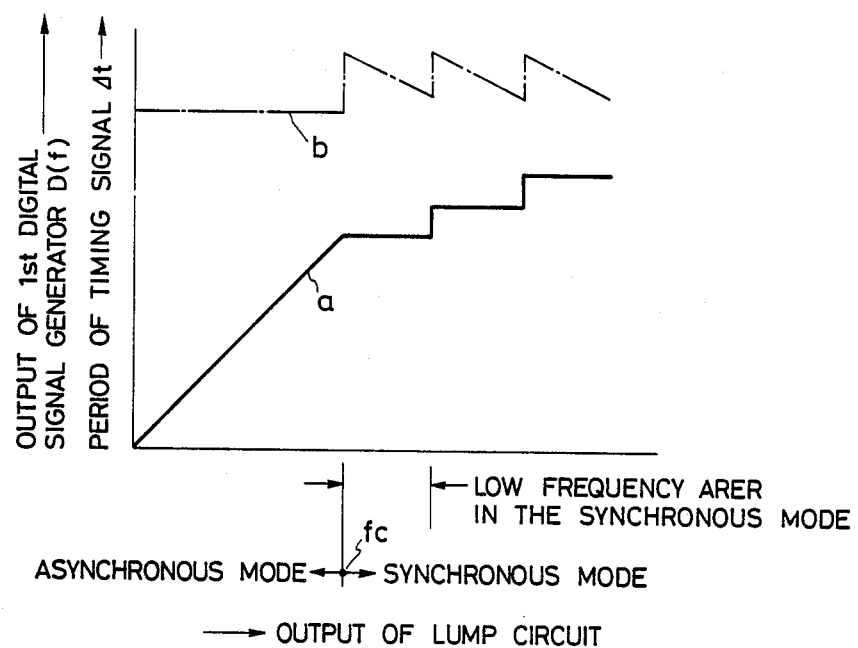
FIG. 5 is a diagram illustrating input vs. output characteristics of the first digital signal generator and of the timing signal generator shown in FIG. 1.
Figure 6:
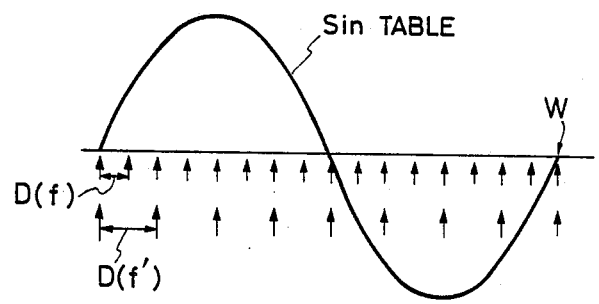
FIG. 6 is a schematic diagram for renewing the phase.

With reference to a control circuit, reference numeral 20 denotes a frequency commander which consists of a frequency setter 20a and a lump circuit 20b. The frequency commander sets a frequency Fout that is to be produced by the inverter 13. The lump circuit 20b produces a digital value. The output D(f) of the first digital signal generator 1 exhibits characteristics as represented by a line (a) in FIG. 5 with respect to the output of the frequency commander 20. In FIG. 5, the abscissa represents a relationship of the asynchronous mode and the synchronous mode. Digital signals D(f) of a preset frequency generated by the first digital signal generator 1 are added up together by an adder 2 for each of the timing pulses P1 generated by a timing generator 4 such as a timer or the like. The period of output pulses generated by the timing signal generator 4 exhibits characteristics as represented by a line (b) in FIG. 5. In the asynchronous operation mode, therefore, the output D(f) of the first digital signal generator 1 is added up after every predetermined period. Further, the output D(f) increases with the increase in the output of the lump circuit 20b. In the synchronous operation mode, the value of the output D(f) changes stepwisely, while the period Δt of timing pulses P produced by the timing generator 4 changes in the form of saw tooth. After the value of the output D(f) has changed stepwisely, the cut number of PWM in one period changes in the output of the inverter 13. The cut number stepwisely decreases with the increase in the output of the frequency commander 20.

Figure 4:
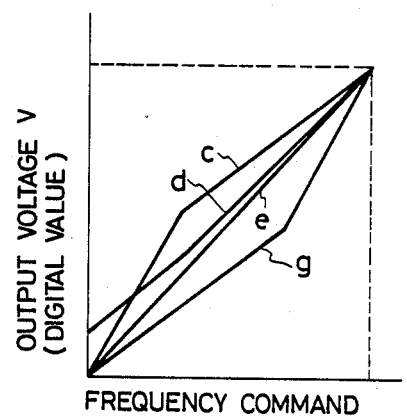
FIG. 4 is a diagram illustrating input vs. output characteristics of the second digital signal generator shown in FIG. 1.

A sinusoidal wave generator 3 generates data of a sinusoidal wave sin θ depending upon the added result θ of the adder 21. That is, the added result θ of the adder 2 assumes a phase of the sinusoidal wave to obtain data of sinusoidal wave that corresponds to the phase. As the phase is exceeded by 360° of sinusoidal waves, the adder holds an initial value obtained by subtracting 360° therefrom. The second digital signal generator, on the other hand, produces digital data of an output voltage command of a magnitude that corresponds to the output of the frequency commander 20. The output voltage command corresponds to the preset frequency as shown in FIG. 4. The greater the output voltage command, the greater the output. For example, by obtaining data on given characteristics among the characteristics lines c, d, e and g of FIG. 4, there can be expressed any voltage and frequency characteristics.

The second digital signal generator 5 can be realized using a memory element such as a memory device.

Upon receipt of each timing pulse generated from the timing generator 4, the digital calculator 6 calculates the aforementioned equations (1) and (1') relying upon the sinusoidal wave digital data produced from the sinusoidal wave generator 3 and the output voltage command (digital) produced from the second digital signal generator 5. Thus, the timings generated by the PWM signals are calculated, i.e., the times Tp1 and Tp2 are calculated from the vertex of the carrier wave of FIG. 3 to the rise and break of the PWM signals. Utilizing the result of this calculation, the PWM signal generator 7 generates PWM signal. The PWM signals are amplified through a drive circuit a and are supplied to a power element of the inverter 13.

Figure 3:
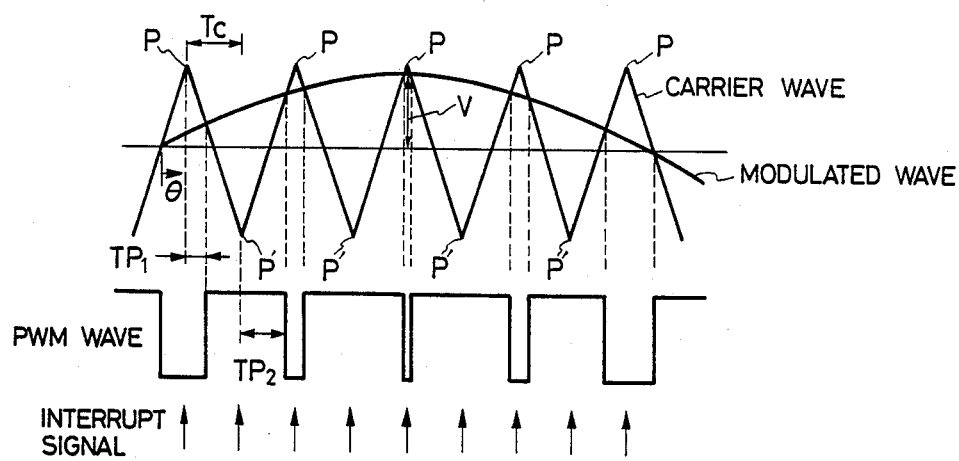
FIG. 3 is a timing chart illustrating a relationship among the carrier wave, modulated wave and PWM wave.

In the aforementioned embodiment, the timing pulses produced from the timing signal generator 4 represent vertexes P, P' of the carrier wave of FIG. 3. In the case of the asynchronous operation mode, the timing becomes constant as shown in FIG. 5. Further, the sinusoidal wave data produced from the sinusoidal generator 3 form modulated waves in FIG. 3, and the output of the adder 2 forms a phase θ of the modulated wave.

Figure 2:
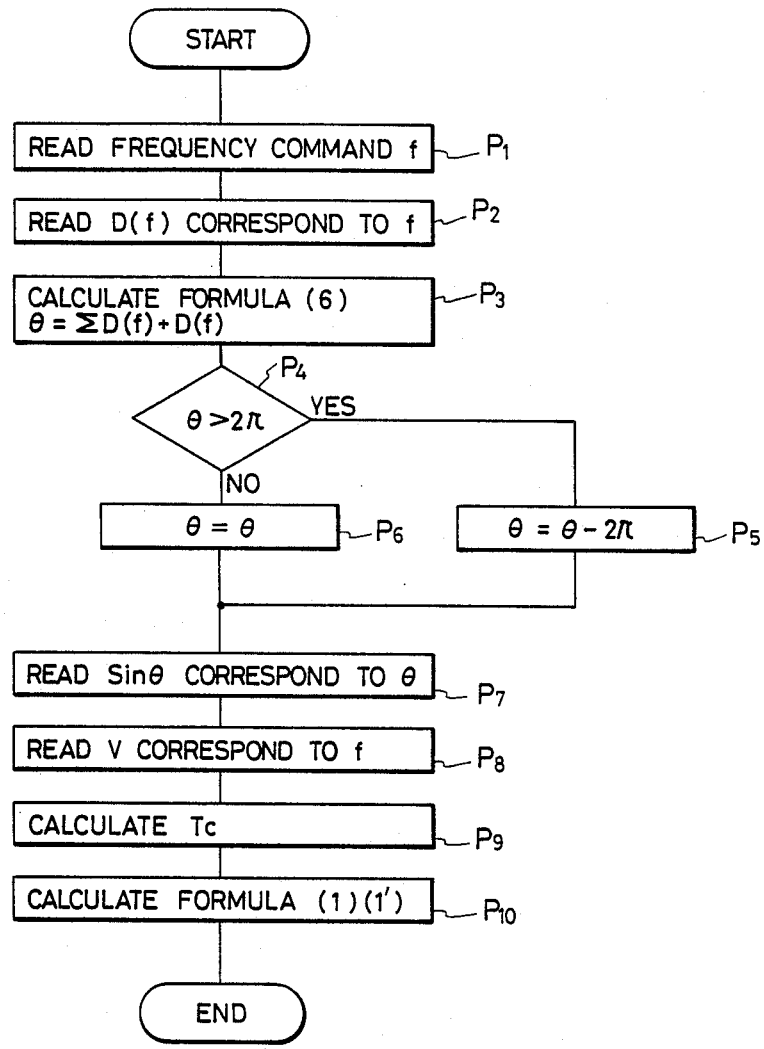
FIG. 2 is a flow chart for explaining the operation of the embodiment of the present invention.

FIG. 2 is a flow chart for synthesizing the PWM waveform. In a process block P1, a frequency command f is read from the frequency commander 20. In a next process block P2, the first digital signal generator 1 produces D(f) that corresponds to the frequency command f. In a next process block P3, the adder 2 executes $\theta = \Sigma D(f) + D(f)$, i.e., executes the equation (6).

The adder 2 discriminate $\theta > 2\pi$ in a process block P4. When the result is YES, the procedure proceeds to a process block P5 to produce $\theta = \theta - 2\pi$. When the result is NO, $\theta = \theta$ is produced. The process blocks P5 and P6 are executed by the adder 2.

In a next process block P7, the sinusoidal wave data generator 3 produces $\sin \theta$ that corresponds to $\theta$, and the digital calculator 6 receives it.

In a next process block P8, the second digital signal generator 5 produces a voltage command V that corresponds to the frequency command f, and the digital calculator 6 receives it.

In a next process block P9, the digital calculator 6 finds TC from the timing signal P1 received in the previous time and the timing signal P1 received this time.

In a next process block P10, the digital calculator 6 executes the equations (1) and (1') relying upon $\sin \theta_1$, V and Tc that are received in the process blocks P7, P8 and P9.

Flow of the aforementioned control operation is interrupted by a timing pulse P1 generated from the timing signal generator 4, and is repeated every after the interrupt. If the interrupt is constant, the carrier wave frequency remains constant, and change in the output frequency is determined by the addition of phases, i.e., determined by the digital data D(f) of a present frequency.

Upon receipt of output θ from the adder 2, the phase detector 21 renders the following determination.

$$\phi < \alpha \quad (7)$$

where $$\phi = |\theta + D(f)/2 - 360| \quad (8)$$

If the result $\phi$ is greater than $\alpha$, i.e., greater than the predetermined range, the phase detector 21 does not produce signal h. If the result $\phi$ is smaller than $\alpha$, i.e., lies within the predetermined range, the phase detector 21 produces a signal h. Here, D(f)/2−360° remains constant during the asynchronous operation mode. By employing a relation $\alpha' = 360° - D(f)/2$, therefore, it is allowed to determine whether θ lies within a predetermined value α' and, hence, to determine whether the signal h be produced or not (here, α and α' should desirably be zero). A selector 22 is constituted by a comparator circuit 23 and an AND circuit 24. The comparator circuit 23 compares the output of the frequency commander 20 with a select frequency command fc, and produces a signal i when the output of the frequency commander 20 is equal to, or greater than, the select frequency command fc. The AND circuit 24 produces a signal j when there holds an AND condition of the signals h and i. Unless the signal j is produced, the timing signal generator 4 and the first digital signal generator 1 produce signals of under the asynchronous mode shown in FIG. 5 despite the frequency commander 20 is producing a command of a level large enough to shift the operation to the synchronous operation. That is, unless the signal j is produced, the first digital signal generator 1 produces a signal that increases with the increase in the output of the frequency commander 20 and the timing signal generator 4 produces timing pulses of a predetermined period. When the signal j is produced, a signal is produced as shown in the synchronous mode of FIG. 5. Therefore, the inverter is shifted from the asynchronous operation to the synchronous operation.

The present invention is in no way limited to the above-mentioned embodiment only but can be modified in a vairiety of other ways. For instance, the phase detector may be so designed as to receive the output sin θ of the sinusoidal waveform generator as indicated by a dotted line in FIG. 1 and to produce the signal h by determining whether the absolute value of the output sin θ lies within a predetermined range at a zero-cross point.

The aforementioned description has dealt with the case where the inverter is shfited from the asynchronous operation to the synchronous operation. The invention, however, can also be put into practice even when the inverter is shifted in the reverse direction.

What is claimed is:

1. In a PWM inverter which, in an asynchronous operation mode of a low output frequency, performs an asynchronous operation in which the cut period remains constant irrespective of the change in the output frequency and which, in a synchronous operation mode of a high output frequency, performs a synchronous operation in which the cut period changes accompanying the change in the output frequency, an inverter controller which comprises:

a frequency commander for commanding a frequency that is to be produced by said inverter;

a first signal generator which receives the output of said frequency commander, and which, in said asynchronous operation mode of a small output, produces a signal of a magnitude that corresponds to said output and produces a signal of a predetermined magnitude in at least a low output frequency range in said synchronous operation region of a large output;

a timing signal generator which generates pulses of a predetermined period in said asynchronous operation mode, and generates pulse signals of a frequency that corresponds to the output of said frequency commander in at least said low output frequency range in said synchronous operation mode;

an adder which adds up signals produced by said first signal generator every time when a signal is produced from said timing signal generator, and produces a value obtained by subtracting an amount of 360 degrees from the added value when the phase of a sinusoidal waveform generator has exceeded 360 degrees;

a phase detector which detects the output of said adder when it lies within a predetermined range; and a selector which switches said asynchronous operation into said synchronous operation when the output of said frequency commander exceeds a predetermined value and when it is detected from the output of said phase detector that the output of said adder lies within said predetermined range.

2. In a PWM inverter which, in any asynchronous operation mode of a low output frequency, performs an asynchronous operation in which the cut period remains constant irrespective of the change in the output frequency and which, in a synchronous operation mode of a high output frequency, performs a synchronous operation in which the cut period changes accompanying the change in the output frequency, an inverter controller which comprises:

a frequency commander for commanding a frequency that is to be produced by said inverter;

a first digital signal generator which receives the output of said frequency commander, and which, in said asynchronous operation mode of a small output, produces a digital signal of a magnitude that corresponds to said output and produces a digital signal of a predetermined magnitude in at least a low output frequency range in said synchronous region of a large output;

a timing signal generator which generates pulses of a predetermined period in said asynchronous operation mode, and generates pulse signals of a frequency that corresponds to the output of said frequency commander in at least said low output frequency range in said synchronous operation mode;

an adder which adds up signals produced by said first digital signal generator every time when a signal is produced from said timing signal generator, and produces a value obtained by subtracting an amount of 360 degrees from the added value when the phase of a sinusoidal waveform generator has exceeded 360 degrees;

a phase detector which detects the output of said adder when it lies within a predetermined range; and a selector which switches said asynchronous operation into said synchronous operation when the output of said frequency commander exceeds a predetermined value and when it is detected from the output of said phase detector that the output of said adder lies within said predetermined range.

3. In a PWM inverter which, in an asynchronous operation mode of a low output frequency, performs an asynchronous operation in which the cut period remains constant irrespective of the change in the output frequency and which, in a synchronous operation mode of a high output frequency, performs a synchronous operation in which the cut period changes accompanying the change in the output frequency, an inverter controller which comprises:

a frequency commander for commanding a frequency that is to be produced by said inverter;

a first digital signal generator which receives the output of said frequency commander, and which, in said asynchronous operation mode of a small output, produces a digital signal of a magnitude that corresponds to said output and produces a digital signal of a predetermined magnitude in at least a low output frequency range in said synchronous region of a large output;

a timing signal generator which generates pulses of a predetermined period in said asynchronous operation mode, and generates pulse signals of a frequency that corresponds to the output of said frequency commander in at least said low output frequency range in said synchronous operation mode;

an adder which adds up signals produced by said first digital signal generator every time when a signal is produced from said timing signal generator, and produces a value obtained by subtracting an amount of 360 degrees from the added value when the phase of a sinusoidal waveform generator has exceeded 360 degrees;

a phase detector which detects the output of said adder when it lies within a predetermined range;

a selector which switches said asynchronous operation into said synchronous operation when the output of said frequency commander exceeds a predetermined value and when it is detected by said phase detector that the output of said adder lies within said predetermined range;

a second digital signal generator which, in response to the output of said first digital signal generator, produces a digital signal that increases with the increase of said output;

said sinusoidal waveform generator which receives the output of said adder to produce a sinusoidal waveform data of a phase corresponding to said output;

a digital calculator which receives the output of said second digital signal generator and the output of said sinusoidal waveform generator in synchronism with the timing signal produced by said timing signal generator to calculate a timing for generating a PWM signal;

a PWM signal generator for generating a PWM signal based upon the output of said digital calculator; and a drive circuit for forming a drive signal that will be supplied to the power element of said inverter based upon the output of said PWM signal generator.

4. A PWM inverter controller according to claim 3, wherein said first digital signal generator generates digital signals whose magnitude increases stepwisely with the increase in the output of said frequency commander in said synchronous operation mode, and said timing signal generator produces timing signals that change in the form of a saw tooth if a graph is described by plotting the output of said frequency commander along the abscissa and by plotting the period of generating the timing signals along the ordinate.

5. In a PWM inverter which, in an asynchronous operation mode of a low output frequency, performs an asynchronous operation in which the cut period remains constant irrespective of the change in the output frequency and which, in a synchronous operation mode of a high output frequency, performs a synchronous operation in which the cut period changes accompanying the change in the output frequency, an inverter controller which comprises:

a frequency commander for commanding a frequency that is to be produced by said inverter;

a first digital signal generator which receives the output of said frequency commander, and which, in said asynchronous operation mode of a small output, produces a digital signal of a magnitude that corresponds to said output and produces a digital signal of a predetermined magnitude in at least a low output frequency range in said synchronous region of a large output;

a timing signal generator which generates pulses of a predetermined period in said asynchronous operation mode, and generates pulse signals of a frequency that corresponds to the output of said frequency commander in at least said low output frequency range in said synchronous operation mode;

an adder which adds up signals produced by said first digital signal generator every time when a signal is produced from said timing signal generator, and produces a value obtained by subtracting an amount of 360 degrees from the added value when the phase of a sinusoidal waveform generator has exceeded 360 degrees;

a phase detector which detects the output of said adder when it lies within a predetermined range;

a selector which switches said asynchronous operation into said synchronous operation when the output of said frequency commander exceeds a predetermined value and when said phase detector produces a signal indicating that the output of said sinusoidal waveform generator lies within a predetermined range;

a second digital signal generator which, in response to the output of said first digital signal generator, produces a digital signal that increases with the increase of said output;

said sinusoidal waveform generator which receives the output of said adder to produce a sinusoidal waveform data of a phase corresponding to said output;

a digital calculator which receives the output of said second digital signal generator and the output of said sinusoidal waveform generator in synchronism with the timing signal produced by said timing signal generator to calculate a timing for generating a PWM signal;

a PWM signal generator for generating a PWM signal based upon the output of said digital calculator; and a drive circuit for forming a drive signal that will be supplied to the power element of said inverter based upon the output of said PWM signal generator.

6. A PWM inverter controller according to claim 5, wherein said first digital signal generator generates digital signals whose magnitude increases stepwisely with the increase in the output of said frequency commander in said synchronous operation mode, and said timing signal generator produces timing signals that change in the form of a saw tooth if a graph is described by plotting the output of said frequency commander along the abscissa and by plotting the period of generating the timing signals along the ordinate.

7. In a PWM inverter which, in an asynchronous operation mode of a low output frequency, performs an asynchronous operation in which the cut period remains constant irrespective of the change in the output frequency and which, in a synchronous operation mode of a high output frequency, performs a synchronous operation in which the cut period changes accompanying the change in the output frequency, an inverter controller which comprises:

a frequency commander for commanding a frequency that is to be produced by said inverter;

a first signal generator which receives the output of said frequency commander, and which, in said asynchronous operation mode of a small output, produces a signal of a magnitude that corresponds to said output and produces a signal of a predetermined magnitude in at least a low output frequency range in said synchronous operation region of a large output;

a timing signal generator which generates pulses of a predetermined period in said asynchronous operation mode, and generates pulse signals of a frequency that corresponds to the output of said frequency commander in at least said low output frequency range in said synchronous operation mode;

an adder which adds up signals produced by said first signal generator every time when a signal is produced from said timing signal generator, and produces a value obtained by subtracting an amount of 360 degrees from the added value when the phase of a sinusoidal waveform generator has exceeded 360 degrees;

a phase detector which detects the output of said adder when it assumes a value that indicates the phase of just 360 degrees; and a selector which switches said asynchronous operation into said synchronous operation when the output of said frequency commander exceeds a predetermined value and when it is detected from the output of said phase detector that the output of said adder lies within said predetermined range.

* * * * *